B. F. STEPHENS.
Chuck for Planing Machines.

No. 235,469.  Patented Dec. 14, 1880.

Witnesses
Chas. H. Smith
Geo. D. Pinckney

Inventor
Benjamin F. Stephens.
per Lemuel W. Serrell
Atty.

UNITED STATES PATENT OFFICE.

BENJAMIN F. STEPHENS, OF BROOKLYN, NEW YORK.

CHUCK FOR PLANING-MACHINES.

SPECIFICATION forming part of Letters Patent No. 235,469, dated December 14, 1880.

Application filed June 15, 1878.

*To all whom it may concern:*

Be it known that I, BENJAMIN F. STEPHENS, of Brooklyn, in the county of Kings and State of New York, have invented an Improvement in Chucks for Planing-Machines, of which the following is a specification.

In planing, shaping, and other machines it is often important to hold comparatively small articles while being planed, and to turn those articles at different angles to the line of motion of the bed, so as to plane one surface at an inclination or taper to the other.

The object of my invention is to facilitate the holding and the adjustment of articles in the planing-machine, so that such articles can be planed in the required manner and adjusted for taper or irregular work.

I make use of a circular base that is adapted to be attached to the bed of the planing-machine and guided in its position by ribs entering one of the longitudinal grooves in the bed. Upon this base there is a swivel-rest for the clamping-vise, and upon the jaw of such vise there is a taper attachment for holding tapering or irregular articles, and upon the circular base there are divisions marking the degrees or parts of a circle, so that the vise-stock and vise can be placed at any desired angle to the line of motion of the bed.

Figure 1:
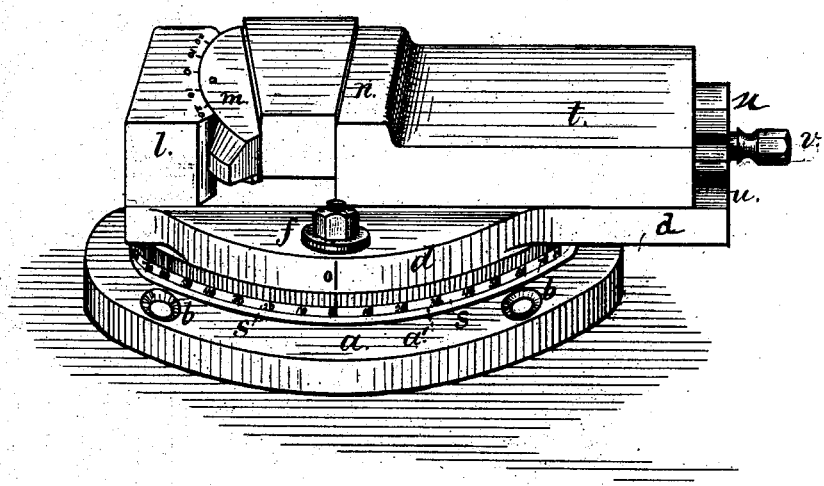
Figure 2:
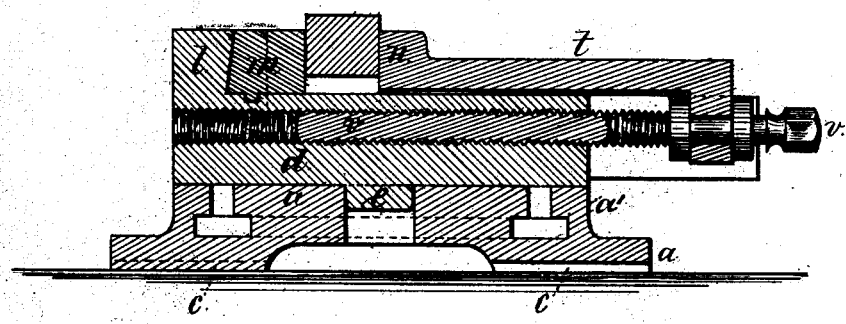

In the drawings, Figure 1 is a perspective view of the planer-vise and its base, and Fig. 2 is a vertical section of the same.

The base *a* is by preference circular. It has holes *b* through it for the reception of bolts that attach it to the bed of a planing-machine, and there are also by preference downwardly-projecting ribs *c*, that fit the longitudinal groove of the planing-machine bed. There is a circular bearing, *a'*, upon the base *a* for the stock *d* of the planer-vise.

A central pivot, *e*, passes into a hole in the base *a*, and there is a double undercut circular groove in the base *a*, that receives the heads and lower parts of the bolts *f*, that pass up through the vise-stock *d*, and are provided with nuts for clamping the vise-stock firmly in place when adjusted.

It is to be understood that the double undercut groove is similar to the grooves in the beds of planing-machines, only circular, the lower part of the groove being the widest, so as to receive the bolt-heads, and the upper part corresponding in width to the diameter of the body of the bolts. The bolts are entered up from below the base *a* through a hole that is large enough for the bolt-heads to pass through in reaching the said groove.

Around the circular portion of the base *a* there are marks indicating degrees or other divisions of the circle, as at *s*, and at *o* there is an index-point on the stock *d*, so that the stock can be placed and held at the desired position relatively to the base.

Upon the stock *d* is the stationary jaw *l*, that is provided with a concave segmental face that receives the taper-attachment jaw *m*, similar to that in the Patent No. 125,625, so as to be adapted to receiving irregular or tapering articles. The jaw *n* is upon a slide, *t*, that moves back and forth upon the guideways *u* upon the stock *d*, and is actuated by a screw, *v*, so as to clamp and hold firmly any article placed between the jaws.

If desired, the jaws *l m* of the taper attachment may have divisions marked upon the adjacent edges, so as to indicate 0, or zero, when the jaw-faces are parallel, and also the angles of inclination, one way or the other, as the jaw *m* slides endwise to accommodate the article grasped.

I am aware that chucks and vises have been made with a base and a bed with jaws. They, however, were not adapted to holding tapering articles and determining the angle between one face that is being planed and another.

I am also aware that taper attachments for vises are old. In my improvement, by making the base and stock circular, and marking divisions in degrees, and having one jaw plain and the other with a taper attachment, I am enabled to hold wedge-shaped articles and plane one vertical face corresponding to the plain jaw, and then turn the vise-stock the required number of degrees for planing the other face, thus accomplishing what has not before been done.

It is to be understood that the part of the article that is being planed projects above the vise-jaws.

I claim as my invention—

The combination, with the circular vise-stock and base having divisions, of the jaws $l\ n$, and the taper attachment $m$ upon one jaw, substantially as set forth, whereby the vise is adapted to hold tapering and irregular articles while being planed, substantially as specified.

Signed by me this 13th day of June, A. D. 1878.

BENJ. F. STEPHENS.

Witnesses:
  GEO. T. PINCKNEY,
  CHAS. H. SMITH.